(12) United States Patent
Gimson et al.

(10) Patent No.: US 7,555,564 B2
(45) Date of Patent: Jun. 30, 2009

(54) DOCUMENT DELIVERY

(75) Inventors: Roger Brian Gimson, Bristol (GB); Stuart Kennedy Williams, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

(21) Appl. No.: 11/059,339

(22) Filed: Feb. 17, 2005

(65) Prior Publication Data
US 2006/0031411 A1 Feb. 9, 2006

(30) Foreign Application Priority Data
Jul. 10, 2004 (GB) ................... 0415467.0

(51) Int. Cl.
*G06F 15/16* (2006.01)

(52) U.S. Cl. .................. 709/245; 709/203; 709/217; 709/246; 709/248; 715/238; 715/253; 715/277

(58) Field of Classification Search ............. 709/203, 709/217, 245, 246, 248
See application file for complete search history.

(56) References Cited

U.S. PATENT DOCUMENTS

| | | | |
|---|---|---|---|
| 6,476,833 B1 * | 11/2002 | Moshfeghi | 715/854 |
| 6,665,659 B1 * | 12/2003 | Logan | 707/3 |
| 6,956,308 B2 * | 10/2005 | Binnard | 310/52 |
| 6,970,869 B1 * | 11/2005 | Slaughter et al. | 707/10 |
| 7,200,585 B2 * | 4/2007 | Kinno et al. | 707/2 |
| 7,337,910 B2 * | 3/2008 | Cartmell et al. | 209/245 |
| 2001/0034771 A1 * | 10/2001 | Hutsch et al. | 709/217 |
| 2002/0055915 A1 * | 5/2002 | Zhang | 707/1 |
| 2002/0062398 A1 * | 5/2002 | Chang et al. | 709/246 |
| 2002/0138649 A1 * | 9/2002 | Cartmell et al. | 709/245 |
| 2003/0158969 A1 | 8/2003 | Gimson | |
| 2004/0024867 A1 * | 2/2004 | Kjellberg | 709/224 |
| 2004/0221079 A1 * | 11/2004 | Goldick | 710/200 |
| 2004/0249951 A1 * | 12/2004 | Grabelsky et al. | 709/227 |
| 2005/0060381 A1 * | 3/2005 | Huynh et al. | 709/206 |
| 2006/0020631 A1 * | 1/2006 | Cheong Wan et al. | 707/104.1 |

FOREIGN PATENT DOCUMENTS

GB 2367665 A 4/2002
WO WO 03/102787 12/2003

OTHER PUBLICATIONS

T. Berners-Lee, "Axioms of web architecture—Fragment identifiers," Apr. 2, 1998, http://www.w3.org/DesignIssues/Fragment.html.
W3C, "HTML 4.01 Specification," Dec. 24, 1999, http://www.w3.org/TR/1999/REC-html401-19991224/, see especially "Links" from http://www.w2.org/TR/1999/REC-html40119991224/struct/links.html.

* cited by examiner

Primary Examiner—Michael Won

(57) ABSTRACT

A server has a memory 16 arranged to have a document 17 having a number of parts stored in it. The server is arranged to: receive a request including a URI having a document identifier which identifies both the whole and a part of the document; determine capabilities of the device; and deliver an appropriate portion of the document containing at least the identified part, the portion depending on the capabilities.

10 Claims, 11 Drawing Sheets document   .../doc#...   .../doc?...
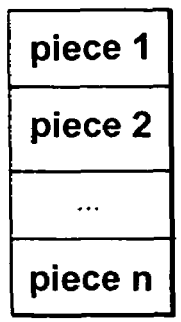 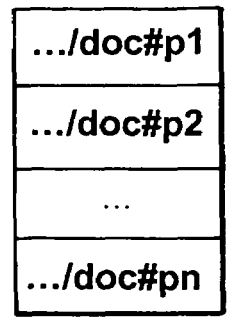 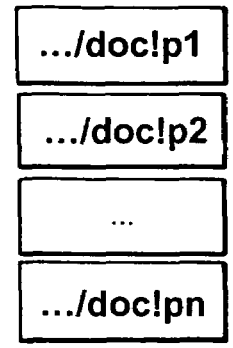
*Fig. 1*   *Fig. 2*   *Fig. 3*
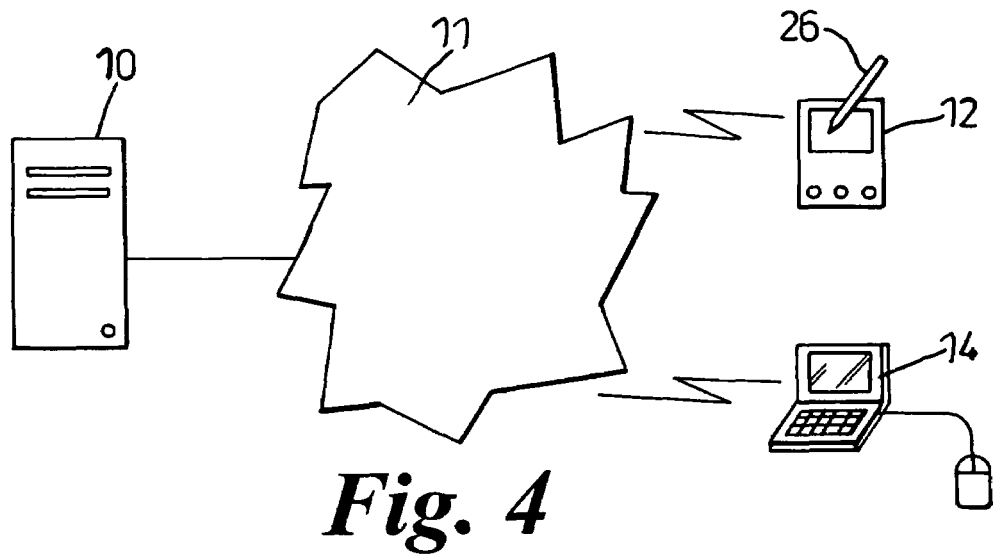
*Fig. 4*
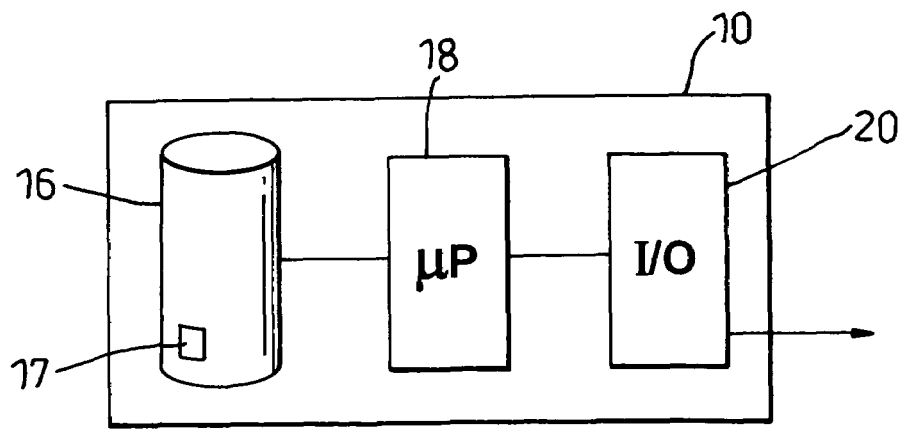
*Fig. 5a*

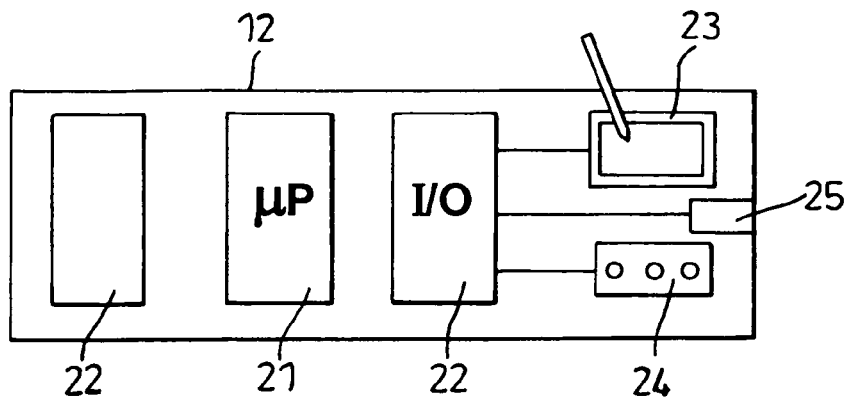
*Fig. 5b*
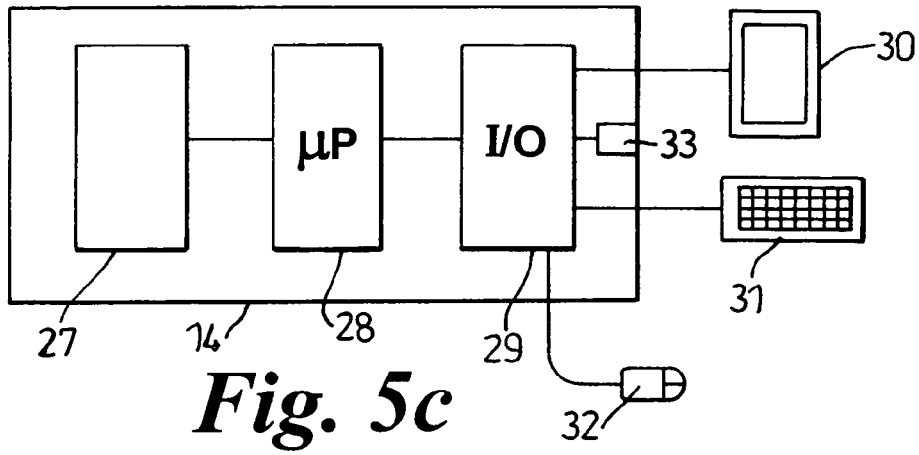
*Fig. 5c*
```
RewriteCond  %{HTTP_USER_AGENT}   .*Windows\ CE.*
RewriteRule  ^(.*)\!part(.+)$     $1.part$2        [L]
RewriteRule  ^(.*)\!part(.+)$     $1               [L]
RewriteEngine on
```
*Fig. 11*
```
Mozilla/2.0 (compatible; MSIE 3.02; Windows CE; PPC; 240x320)
```
*Fig. 12*

```
<html>
<head>
  <title>Example document</title>          ──── 40
</head>

<body>  ──── 55
                                  ──── 52                          ──── 42
<a name="part1"/>
<h1>Example document</h1>
<h2>First part (Contents)</h2>                              ──── 56
<ul><li><a href="example!part2#part2">Second part</a></li>
<li><a href="example!part3#part3">Third part</a></li>            44
<li><a href="example!part4#part4">Fourth part</a></li></ul>

<p>...body of first part...</p>
<p>Lorem ipsum dolor sit amet, consectetur adipisicing elit, sed do eiusmod tempor
incididunt ut labore et dolore magna aliqua. Ut enim ad minim veniam, quis nostrud
exercitation ullamco laboris nisi ut aliquip ex ea commodo consequat. Duis aute irure
dolor in reprehenderit in voluptate velit esse cillum dolore eu fugiat nulla pariatur.
Excepteur sint occaecat cupidatat non proident, sunt in culpa qui officia deserunt
mollit anim id est laborum.</p>

<a name="part2"/>                              54                    46
<h2>Second part</h2>

<p>...body of second part...</p>
<p>Sed ut perspiciatis unde omnis iste natus error sit voluptatem accusantium doloremque
laudantium, totam rem aperiam, eaque ipsa quae ab illo inventore veritatis et quasi
architecto beatae vitae dicta sunt explicabo. Nemo enim ipsam voluptatem quia voluptas
sit aspernatur aut odit aut fugit, sed quia consequuntur magni dolores eos qui ratione
voluptatem sequi nesciunt.</p>
                                                                48
<a name="part3"/>
<h2>Third part</h2>

<p>...body of third part...</p>
<p>Neque porro quisquam est, qui dolorem ipsum quia dolor sit amet, consectetur,
adipisci velit, sed quia non numquam eius modi tempora incidunt ut labore et dolore
magnam aliquam quaerat voluptatem. Ut enim ad minima veniam, quis nostrum exercitationem
ullam corporis suscipit laboriosam, nisi ut aliquid ex ea commodi consequatur? Quis
autem vel eum iure reprehenderit qui in ea voluptate velit esse quam nihil molestiae
consequatur, vel illum qui dolorem eum fugiat quo voluptas nulla pariatur?</p>

<a name="part4"/>                                            50
<h2>Fourth part</h2>

<p>...body of fourth part...</p>
<p>At vero eos et accusamus et iusto odio dignissimos ducimus qui blanditiis praesentium
voluptatum deleniti atque corrupti quos dolores et quas molestias excepturi sint
occaecati cupiditate non provident, similique sunt in culpa qui officia deserunt
mollitia animi, id est laborum et dolorum fuga. Et harum quidem rerum facilis est et
expedita distinctio. Nam libero tempore, cum soluta nobis est eligendi optio cumque
nihil impedit quo minus id quod maxime placeat facere possimus, omnis voluptas assumenda
est, omnis dolor repellendus. Temporibus autem quibusdam et aut officiis debitis aut
rerum necessitatibus saepe eveniet ut et voluptates repudiandae sint et molestiae non
recusandae. Itaque earum rerum hic tenetur a sapiente delectus, ut aut reiciendis
voluptatibus maiores alias consequatur aut perferendis doloribus asperiores
repellat.</p>

</body>  ──── 55
</html>
```

*Fig. 6*

```
<html>
<head>
   <title>Example document</title>          ← 60
</head>
                    65
<body>  ←
                                             62
<a name="part1"/>   ←
<h1>Example document</h1>
<h2>First part (Contents)</h2>
<ul><li><a href="example!part2#part2">Second part</a></li>
<li><a href="example!part3#part3">Third part</a></li>              64
<li><a href="example!part4#part4">Fourth part</a></li></ul>        /
                                                                   /
<p>...body of first part...</p>
<p>Lorem ipsum dolor sit amet, consectetur adipisicing elit, sed do eiusmod tempor
incididunt ut labore et dolore magna aliqua. Ut enim ad minim veniam, quis nostrud
exercitation ullamco laboris nisi ut aliquip ex ea commodo consequat. Duis aute irure
dolor in reprehenderit in voluptate velit esse cillum dolore eu fugiat nulla pariatur.
Excepteur sint occaecat cupidatat non proident, sunt in culpa qui officia deserunt
mollit anim id est laborum.</p>

<a href="example!part2#part2">next</a>
</body>  ←
</html>      65
```

*Fig. 7*

```
<html>
<head>
   <title>Example document</title>   ←——— 60
</head>
                 65
<body>  ←
                                     62                64
<a name="part2"/>   ←
<h2>Second part</h2>                                   /
                                                       /
<p>...body of second part...</p>
<p>Sed ut perspiciatis unde omnis iste natus error sit voluptatem accusantium doloremque
laudantium, totam rem aperiam, eaque ipsa quae ab illo inventore veritatis et quasi
architecto beatae vitae dicta sunt explicabo. Nemo enim ipsam voluptatem quia voluptas
sit aspernatur aut odit aut fugit, sed quia consequuntur magni dolores eos qui ratione
voluptatem sequi nesciunt.</p>

<a href="example!part1#part1">top</a>
<a href="example!part1#part1">previous</a>
<a href="example!part3#part3">next</a>
</body>  ←
</html>      65
```

*Fig. 8*

```
<html>
<head>
   <title>Example document</title>            ← 60
</head>

<body>  ← 65
                        ─ 62
<a name="part3"/>
<h2>Third part</h2>

<p>...body of third part...</p>
<p>Neque porro quisquam est, qui dolorem ipsum quia dolor sit amet, consectetur,
adipisci velit, sed quia non numquam eius modi tempora incidunt ut labore et dolore
magnam aliquam quaerat voluptatem. Ut enim ad minima veniam, quis nostrum exercitationem
ullam corporis suscipit laboriosam, nisi ut aliquid ex ea commodi consequatur? Quis
autem vel eum iure reprehenderit qui in ea voluptate velit esse quam nihil molestiae
consequatur, vel illum qui dolorem eum fugiat quo voluptas nulla pariatur?</p>

<a href="example!part1#part1">top</a>
<a href="example!part2#part2">previous</a>
<a href="example!part4#part4">next</a>
</body>   ─ 65
</html>
```

*Fig. 9*

```
<html>
<head>                              ─ 60
   <title>Example document</title>
</head>
              ─ 65
<body>
<a name="part4"/>              ─ 62
<h2>Fourth part</h2>

<p>...body of fourth part...</p>
<p>At vero eos et accusamus et iusto odio dignissimos ducimus qui blanditiis praesentium
voluptatum deleniti atque corrupti quos dolores et quas molestias excepturi sint
occaecati cupiditate non provident, similique sunt in culpa qui officia deserunt
mollitia animi, id est laborum et dolorum fuga. Et harum quidem rerum facilis est et
expedita distinctio. Nam libero tempore, cum soluta nobis est eligendi optio cumque
nihil impedit quo minus id quod maxime placeat facere possimus, omnis voluptas assumenda
est, omnis dolor repellendus. Temporibus autem quibusdam et aut officiis debitis aut
rerum necessitatibus saepe eveniet ut et voluptates repudiandae sint et molestiae non
recusandae. Itaque earum rerum hic tenetur a sapiente delectus, ut aut reiciendis
voluptatibus maiores alias consequatur aut perferendis doloribus asperiores
repellat.</p>

<a href="example!part1#part1">top</a>
<a href="example!part3#part3">previous</a>
</body>
</html>       ─ 65
```

*Fig. 10*

DOCUMENT DELIVERY

The present invention relates to delivery of documents from a server to a user device.

When documents, such as web pages, are stored on a server, they have a document name, and are stored at a particular location on the server. When a document is requested from the server, the request needs to identify the document name and the server. This identification is usually provided in the form of a uniform resource identifier (URI). A URI is an identifier having a particular format. The syntax of URIs is defined in specification RFC2396. To identify the location of a document, a uniform resource locator (URL) is used, which is a particular type of URI. Where the document is large and is to be delivered in parts, it is known to use different URLs to identify the different parts of the document, so that each part is delivered separately and treated in effect as a separate document. It is also known to use fragment identifiers as part of a URL. These are generally not sent to the server as part of a request for a document, but are used by the user device to identify different parts, or fragments, of the document when it has been delivered to the user device as a single large document. These fragment identifiers can be used, for example, to select which part of a document is to be displayed on the screen of the user device.

The format of a URL for a document (such as an HTML-based web page) is typically in the form 'http://A/B/.../doc', where A identifies the server, '/B/...' identifies the document relative to the server and 'doc' is the document name. Referring to FIG. 1, a document may be in a number of parts here identified as piece 1, piece 2 etc. If the document is to be downloaded to a user device with a large screen, such as a PC, then the document can be delivered whole and the parts of the document can be identified using a fragment identifier as shown in FIG. 2. In this case each part of the document has its own URL comprising the document URL with a fragment identifier #p1 for piece 1 and #p2 for piece 2 etc added to it. These fragment identifiers can be used by the user device to identify the different parts of the document as described above. Referring to FIG. 3, if the document is to be delivered to a small screen device such as a PDA, then the document can be divided into parts that can be delivered independently. These parts are shown in FIG. 3 and are identified by a set of URLs which differ by a suffix !p1, !p2 etc. If the server receives a request for one part of the document, this will include the document name 'doc!pn' for part pn, where n will be 1 or 2 etc for the respective parts, and the server can deliver the requested part.

However it can be a problem with known systems that if it is required to bookmark or otherwise reference a part of the document, the URL produced by the bookmark or other reference will be different depending on the device that is used to create the bookmark or reference.

For example, in the example of FIG. 2, if a bookmark for one part of the document is saved on a large screen device then it will be in the form .../doc#pn. If this bookmark is used from a small screen device, then the device will try to retrieve the whole document. This is because the fragment identifier is not used to determine which part of the document to retrieve, only to identify a position in the whole document when it has been retrieved. Downloading the whole document may overload the presentation capabilities of the small screen device.

On the other hand, in the example of FIG. 3, if the bookmark is saved on a small screen device, it will have the form .../doc!pn. If it is later used on a large screen device, only the identified part of the document will be retrieved. This may lead to inefficient use of the available screen space, and a need to download separately each part of the document.

The present invention therefore provides a server having stored a document, the beginning and end of the document's content being defined by machine readable labels, and the beginning and end of a defined part of the document's content being defined by further machine readable labels, the server being adapted to:
  process a request from a client for the document, the request having the form of a URI which includes a first identifier signifying the document and a second identifier signifying the defined part;
  establish capabilities of the client from the request;
  establish from the client's capabilities that the second identifier is redundant; and
  dispatch the document An electronic document having a plurality of document parts, the document and the parts each having a beginning and an end defined by machine readable labels, and an identifier for each part, the identifier including a component identifying the part of the document and a fragment identifier also identifying the part of the document.

The present invention further provides an electronic document having a plurality of document parts, the document and the parts each having a beginning and an end defined by machine readable labels, and a link to one of the parts, the link including an identifier for said one part, the identifier including a component identifying said one part of the document and a fragment identifier also identifying said one part of the document.

The present invention further provides a method of delivering a document to a user device, the method comprising delivering content of the document together with an identifier of a part of the document, the identifier including a component identifying said one part of the document and a fragment identifier also identifying said one part of the document.

Corresponding data carriers and computer programs are also provided. The data carrier can comprise a floppy disk, a CDROM, a DVD ROM/RAM (including +RW, −RW), a hard drive, a non-volatile memory, any form of magneto optical disk, a wire, a transmitted signal (which may comprise an internet download, an ftp transfer, or the like), or any other form of computer readable medium.

Preferred embodiments of the present invention will now be described by way of example only with reference to the remainder of the accompanying drawings in which:

BRIEF DESCRIPTION OF THE DRAWINGS

FIG. 1 is a schematic diagram of a document in pieces;

FIG. 2 is a schematic diagram of a document fragment identifier;

FIG. 3 is a schematic diagram of document parts to be delivered independently;

FIG. 4 is a schematic diagram of an internet based system according to an embodiment of the invention;

FIG. 5a, 5b and 5c are schematic diagrams of a server forming part of the system of FIG. 4;

FIG. 6 shows the source of a complete document according to an embodiment of the invention stored on the server of FIG. 5;

FIGS. 7 to 10 show the source of parts of the document of FIG. 6 stored separately on the server;

FIG. 11 shows instructions to the server of FIG. 5 enabling it to operate according to the invention;

FIG. 12 shows a user agent string sent by a user device of the system of FIG. 4 to the server of FIG. 4;

Referring to FIG. 4, an internet based system for storing and downloading documents comprises a server 10 connected to the internet 11, a small screen user device, in this case a PDA 12, and a large screen user device, in this case a PC 14. The user devices 12, 14 have wireless internet connections, and the server 10 has a wired internet connection.

Referring to FIG. 5a, the server 10 comprises a memory 16, a processor 18 and an input/output device 20. The memory 16 is arranged to store documents 17, and the processor 18 is arranged to receive requests for delivery of documents 17 over the internet via the I/O device 20, to interpret those requests, and to control the delivery of documents from the memory over the internet via the I/O device 20. Referring to FIG. 5b, the pocket PC 12 comprises a memory 22, processor 21, and I/O devices generally indicated at 22 which are linked to the screen 23, input buttons 24, both of which act as user inputs, and an RF transceiver 25. The screen 23 is a touch screen arranged to detect user inputs made using a stylus 26. The pocket PC runs various software packages including a browser package. As shown in FIG. 5c the PC 14 comprises a memory 27, processor 28, and I/O devices generally indicated as 29 which are linked to the PC screen 30, a keyboard 31 and mouse 32 which act as user inputs, and an RF transceiver 33. The PC also runs various software packages including a browser package. The RF transceivers 25, 33 are arranged to be in contact with internet access points to provide internet access to the pocket PC 12 and the PC 14.

Referring to FIGS. 6 to 10, a document called 'example' is stored in the memory 16 of the server. The document is stored in two formats, that is as a complete document including all of its four parts, suitable for delivery to a large screen device, and as four separate parts, each of which is suitable for delivery to a small screen device. Referring specifically to FIG. 6, the HTML source of the complete document comprises a title 40 which in this case is 'Example document', and a document body 42 that is divided into four parts 44, 46, 48, 50. Each of the parts 44, 46, 48, 50 includes a name 52, for example 'part 1' for the first part, and a body 54 comprising the main text or other content of the document. The beginning and end of the whole document body 42 are marked by HTML tags 55. The source document also includes a number of links, 56 at the top of the document to the various parts 44, 46, 48, 50. These links are in the form 'example!partn#partn', where n is 1 to 4 for each of the respective parts. This copy of the whole document is stored as a file named 'example' on the server 10 at a location '/B/...' and can therefore be located by a URL of the form 'http://A/B/.../example', where 'http://A' identifies the server 10.

Figure 13:
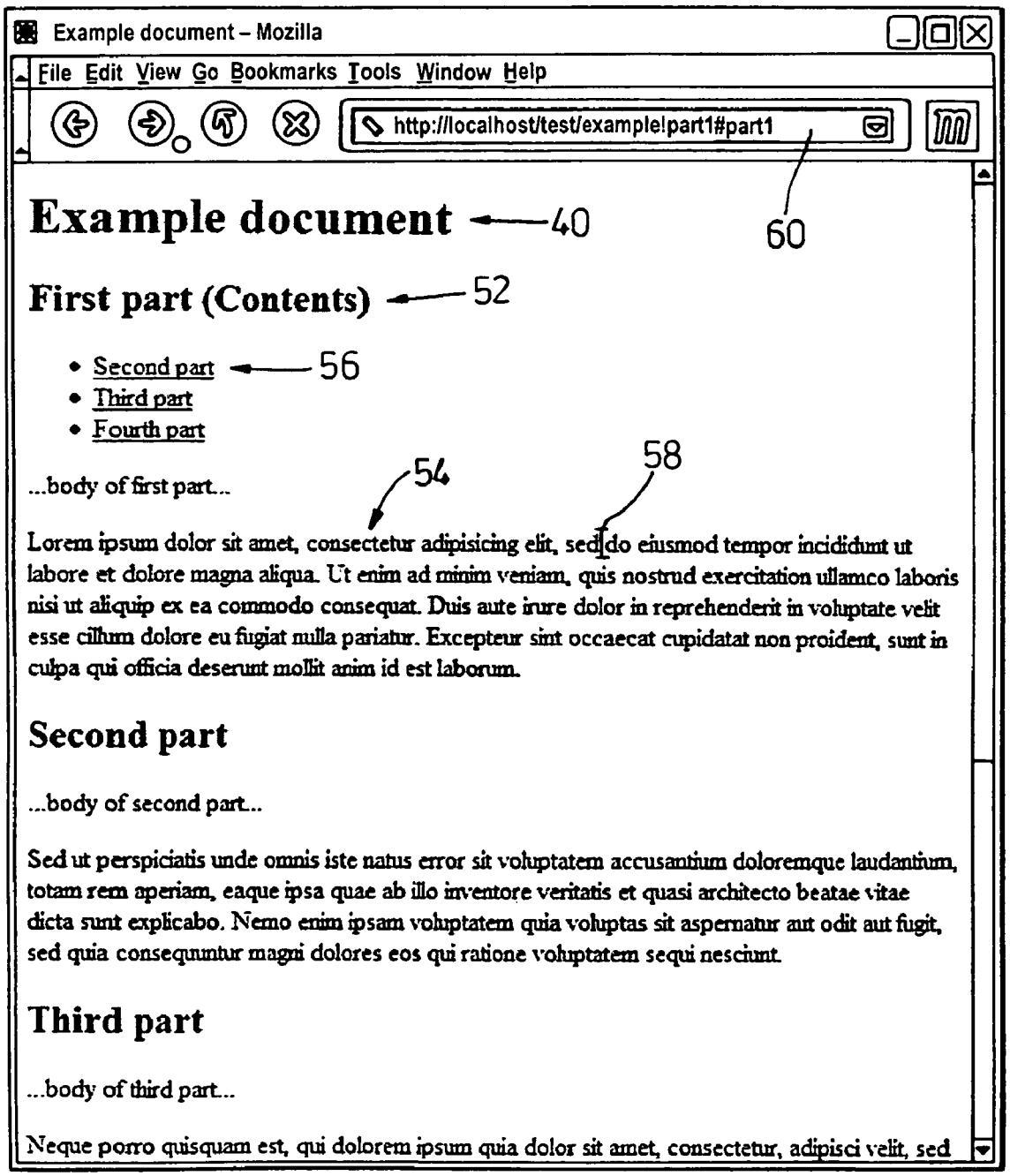
FIGS. 13 and 14 show the document of FIG. 6 displayed on a large screen device of the system of FIG. 4, when different parts of the document have been identified.

Referring specifically to FIGS. 7 to 10, the document is also stored on the server in separate parts suitable for delivery to a small screen device such as the PDA 12. Each of these part sources comprises the title of the document 60, the name 62 of the part in the form 'partn' where n is 1, 2, 3 or 4, and the body 64 of the part. The beginning and end of each part is marked by an HTML tag 65. The source for each part also includes links to each of the other parts in the format 'example!partn#partn', where n is 1 to 4 for each of the respective parts.

The server stores the document parts with file names 'example.partn' at the same location in its memory as the whole document, in this case at location '/B/...'. Each document part can therefore be located using a URL of the format 'http://A/B/.../example!partn', which can be mapped by the server onto the corresponding file name. Different mappings may be used on the server to allow the name used in the URL to be syntactically different from the local file name, so that each can be separately chosen if necessary. The identity mapping, in which the URL name is identical to the file name could also be used.

Links to document parts, such as those used in the index 56, take the form 'example!partn#partn' Here the suffix after the separator ! and the fragment identifier after the separator # are both the same, and both identify the document part, and 'example' is the document name. This means that each part of the document has a full URL in the format 'http://A/B/.../example!partn#partn', where '//A' identifies the server 10, '/B/...' identifies the document relative to the server, 'example' is the name of the document and 'partn' identifies the part of the document, with n being 1 to 4 for each of the respective parts. The whole document has a URL 'http://A/B/.../example'.

The server 10 is arranged to receive requests for either the whole of the document 'example' or parts of it, to determine from the request the display capabilities of the user device making each request, and to respond by delivering either the whole document, using the source of FIG. 6, or a part of the document using the source of one of FIGS. 7 to 10. In particular the server is arranged to receive requests including a URL in the format 'http://A/B/.../example!partn' where '//A' identifies the server 10, '/B/...' identifies the document relative to the server, 'example' is the name of the whole document and 'partn' identifies a part of the document, with n being 1 to 4 for each of the respective parts. It will be noted that this is the format in which the links are embedded in the document source as shown in FIGS. 6 to 10, except that it does not include the fragment identifier that is present in the links. The HTTP server protocol strips the fragment identifiers from the operation request line so that they are not communicated to the origin server.

The server is therefore arranged to interpret the URL in requests of this format in different ways, depending on the capabilities of the user device that makes the request, and in particular on whether it is suitable to display the whole document of only part of it.

In particular the server 10 is arranged to interpret a component of a URL in a document request of the form 'example!partn' as referring to the document 'example.partn' for a Pocket PC and as 'example' for any other user device. This is done by the well-known technique of identifying a particular character string in the HTTP user agent string forming part of the header of the request from the user device to the server. FIG. 11 shows code arranged to configure an Apache web server to recognise a Pocket PC from the substring "Windows CE" in the user agent string, and FIG. 12 shows an example of a user agent string from the Pocket PC 12. The result of this is that if a request for a document part is received by the server in the format 'http://A/B/.../example!partn', then, if the request comes from a Pocket PC, the server will interpret this as a request for the document 'example.partn', and deliver the source of just the requested document part, 'example.partn', as shown in FIGS. 7 to 10. On the other hand, if the request comes from any other user device, the server 10 will interpret the request as a request for the document 'example', i.e. the whole document, and deliver the whole of the document 'example'.

It will be appreciated that other methods of determining the display capabilities, or other relevant capabilities, of the user device could also be used. For example mobile devices may use UAProf (User Agent Profile), as defined by the Open Mobile Alliance.

Figure 14:
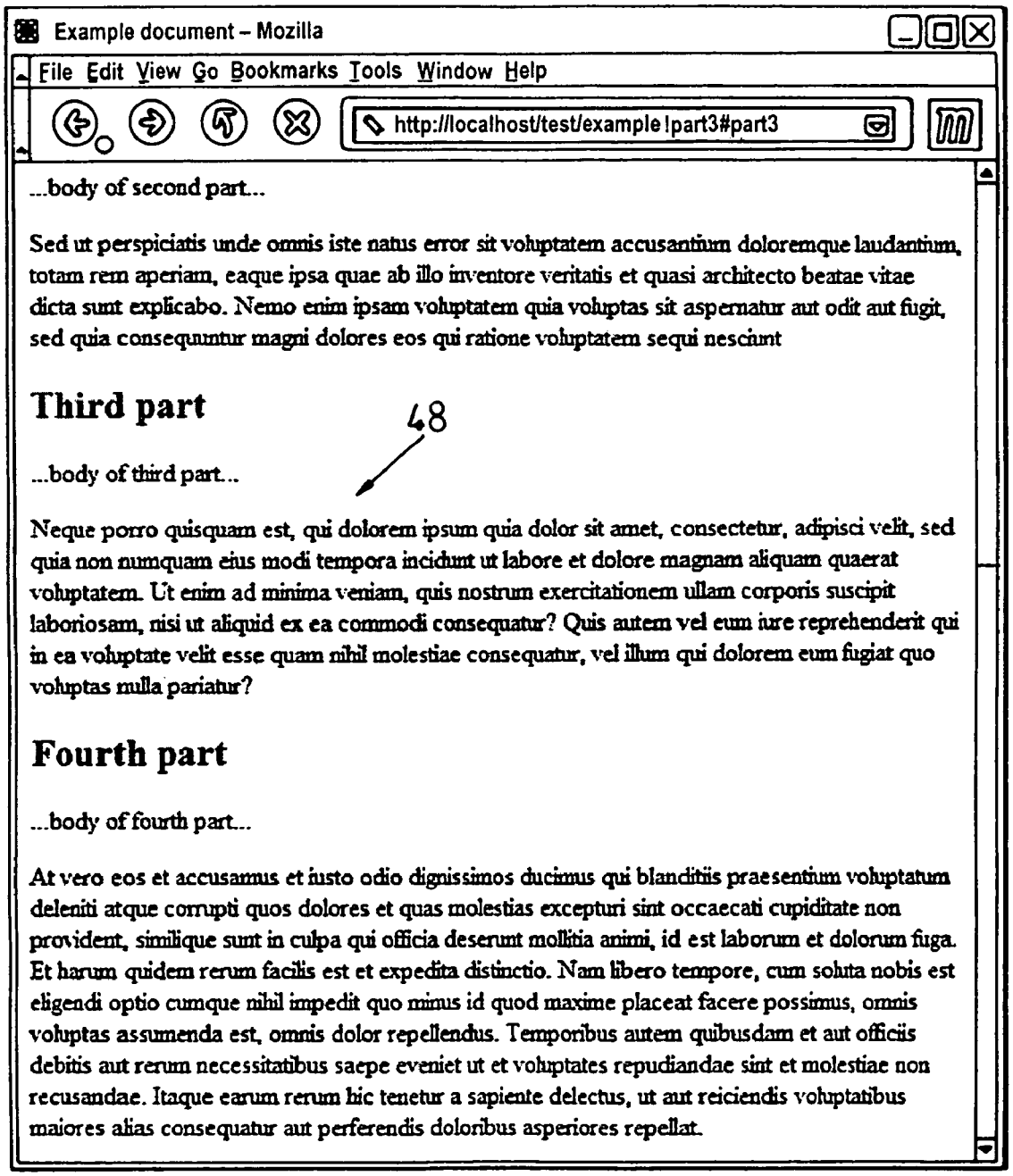

Referring to FIGS. 13 and 14, if the web browser on the PC 14 is used to request a copy of the document 'example' from the server 10, then this could be done using the URL 'http://A/B/ . . . /example', or by using the URL or any of its parts. If such a request is sent to the server 10 from the PC 14, then the server checks the user agent string and determines that the user agent is not a Pocket PC, and sends the source for the whole of the document, as illustrated in FIG. 6, to the PC 14, together with a header that contains the URL of the whole document. The URL is then displayed on the address bar 60 on the PC screen, while the various parts of the document are also displayed on the PC screen. If the user moves about the document using the links 56, the browser will make the appropriate part of the document visible and show its full URL as shown in FIG. 14. For example if the top of the document is displayed as shown in FIG. 13, and the user clicks on the link 56 for the third part, using user inputs 31, 32, then the browser will display a different part of the document including the third part, as shown in FIG. 14. This is possible because a fragment identifier #partn is associated with each part of the document, and the browser is configured to interpret fragment identifiers in this way to move between different parts or fragments of a document using the fragment identifiers.

If, while viewing the document, the user wants to bookmark the current view, the browser saves the bookmark in the full URL format, for example 'http://A/B/ . . . /example!part3#part3' if the third part of the document is currently being viewed.

If subsequently the browser on the PC 14 is used to retrieve the document using the bookmarked URL 'http://A/B/ . . . /example!part3#part3', then the browser is arranged to send a request to the server 10 containing the URL in the format 'http://A/B/ . . . /example!part3', having first removed the fragment identifier. The server 10 identifies this as referring to the document 'example' that can be delivered complete or in parts, checks the user agent string in the request from the PC, determines from the string that the PC is not a Pocket PC, and interprets the request be for the whole document 'example'. The 'part3' component of the URL is treated as being redundant, and the server therefore delivers the document at http://A/B/ . . . /example, i.e. the whole document 'example' including all four parts. When this document is received by the browser, the browser uses the original fragment identifier to select which part to display. In this case as the original request was for the fragment #part3, the browser selects the third part of the document and positions the document in the display as shown in FIG. 14.

Figure 15:
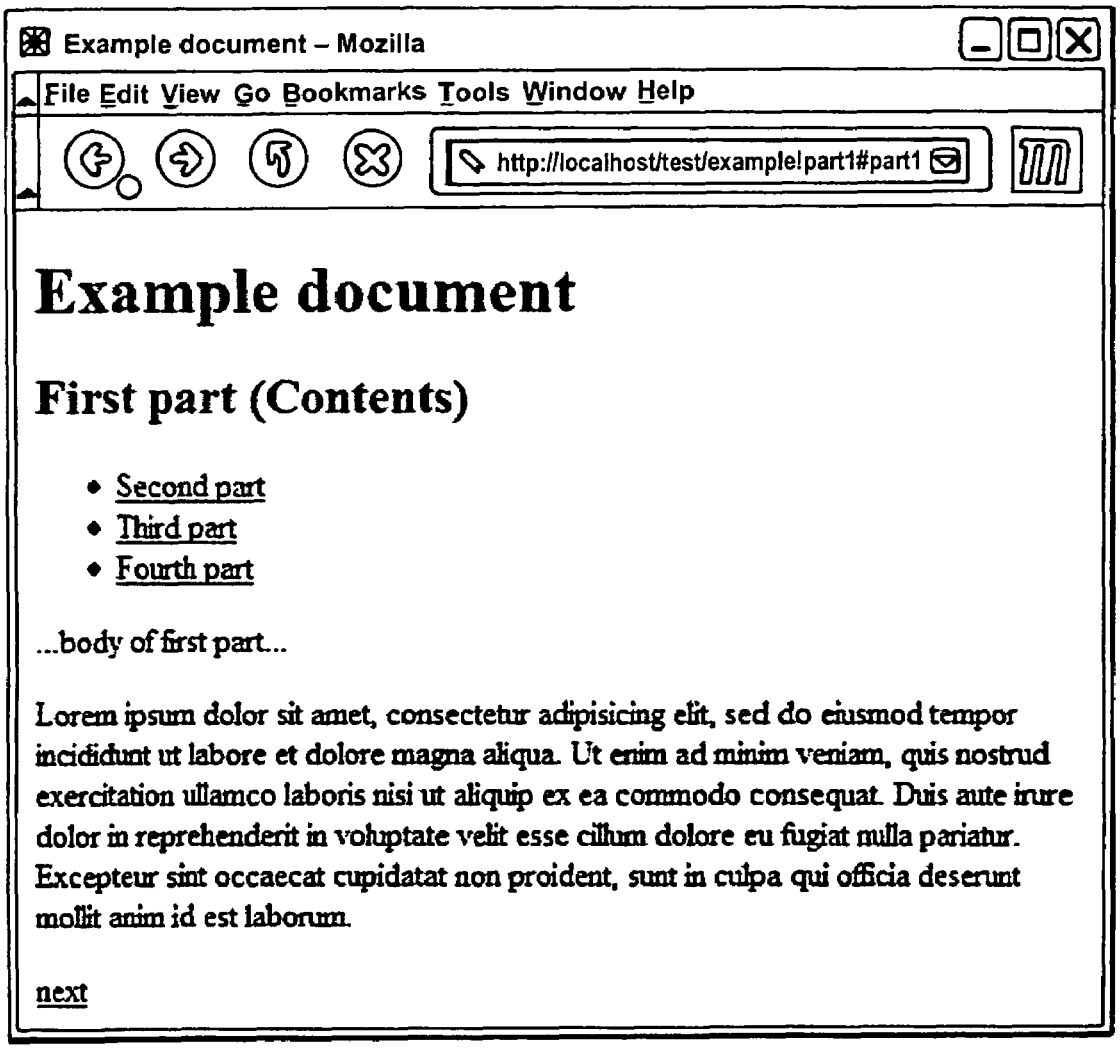
FIGS. 15 to 18 show the document parts of FIGS. 7 to 10 as displayed on a small screen device of the system of FIG. 4.
Figure 16:
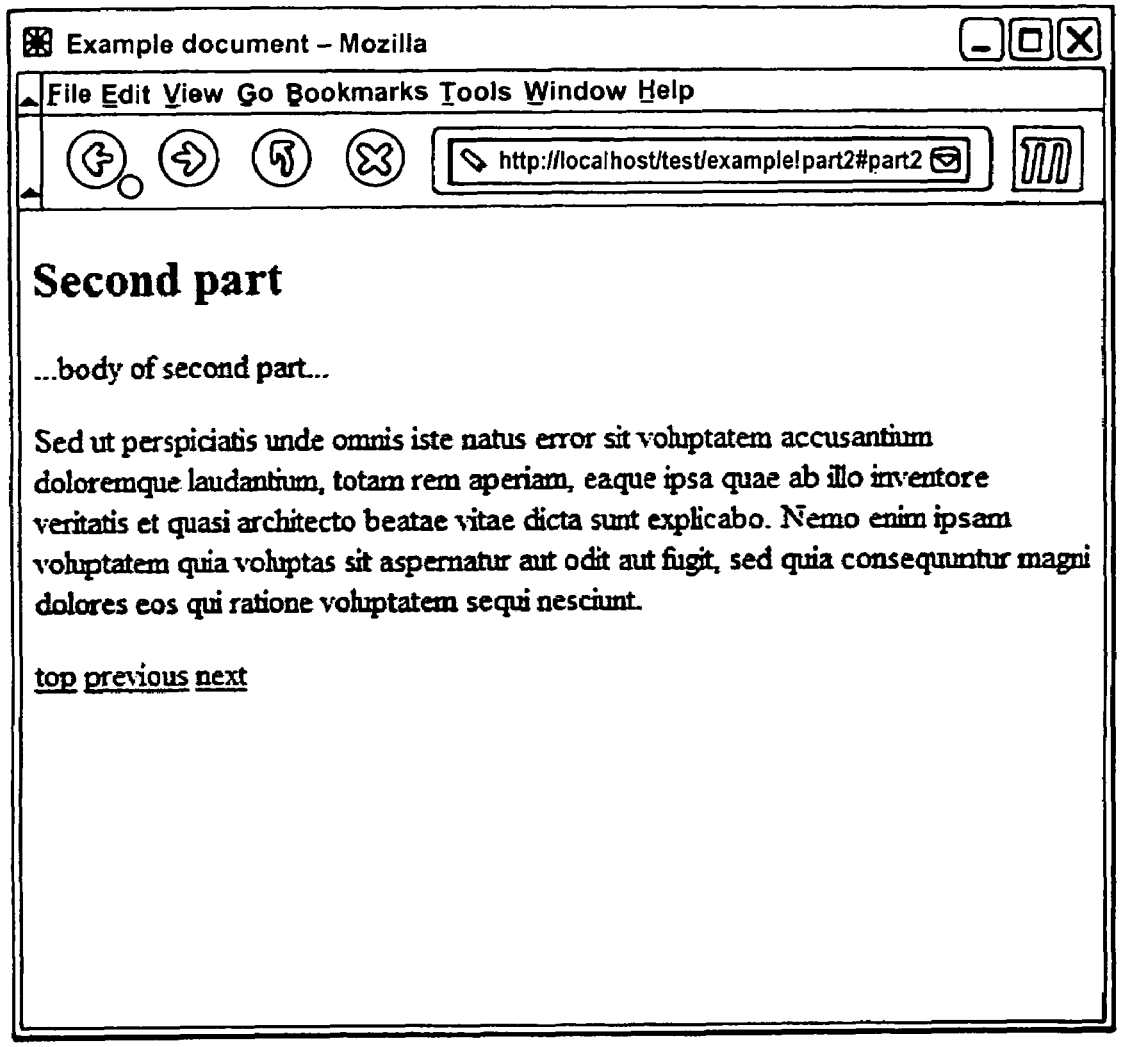
Figure 17:
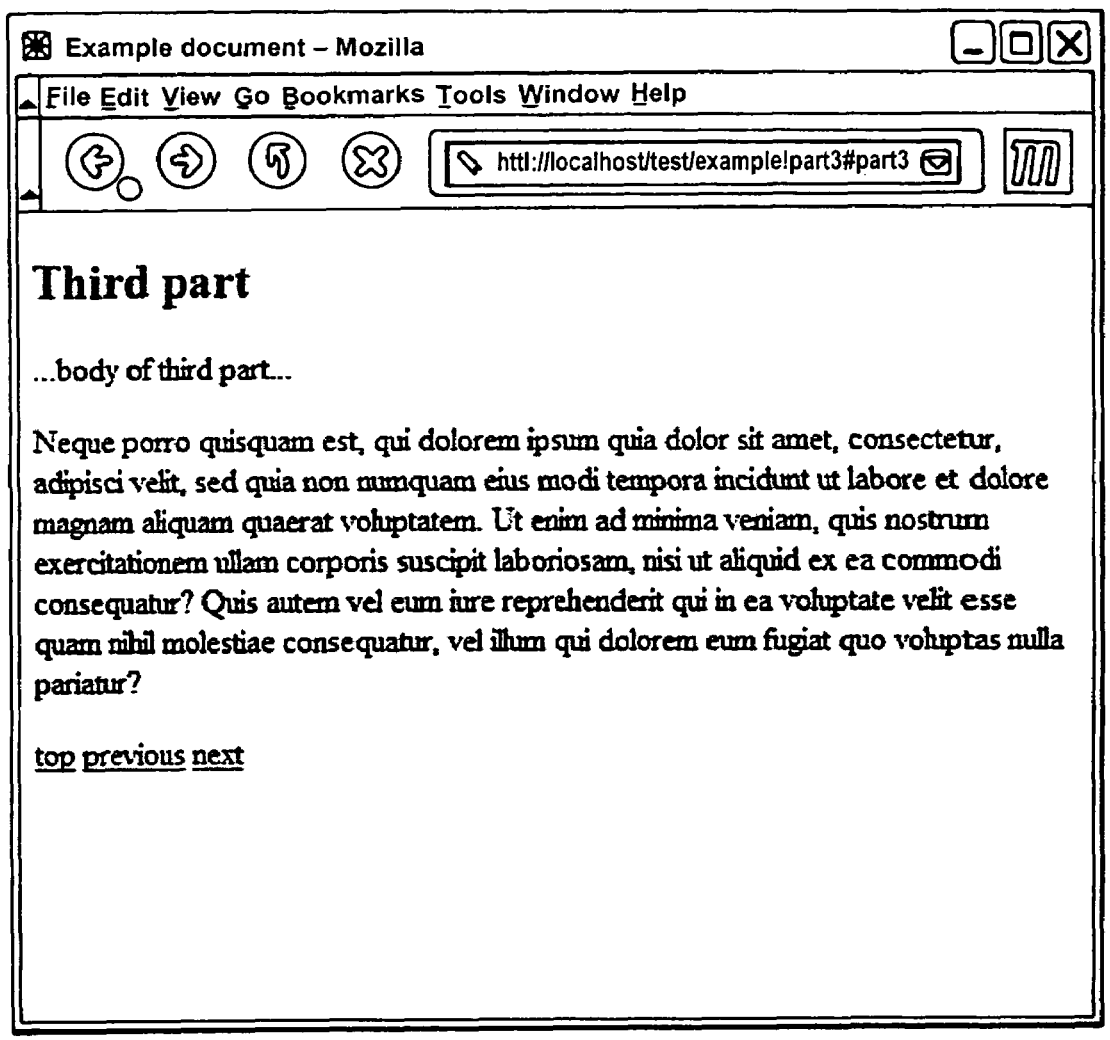
Figure 18:
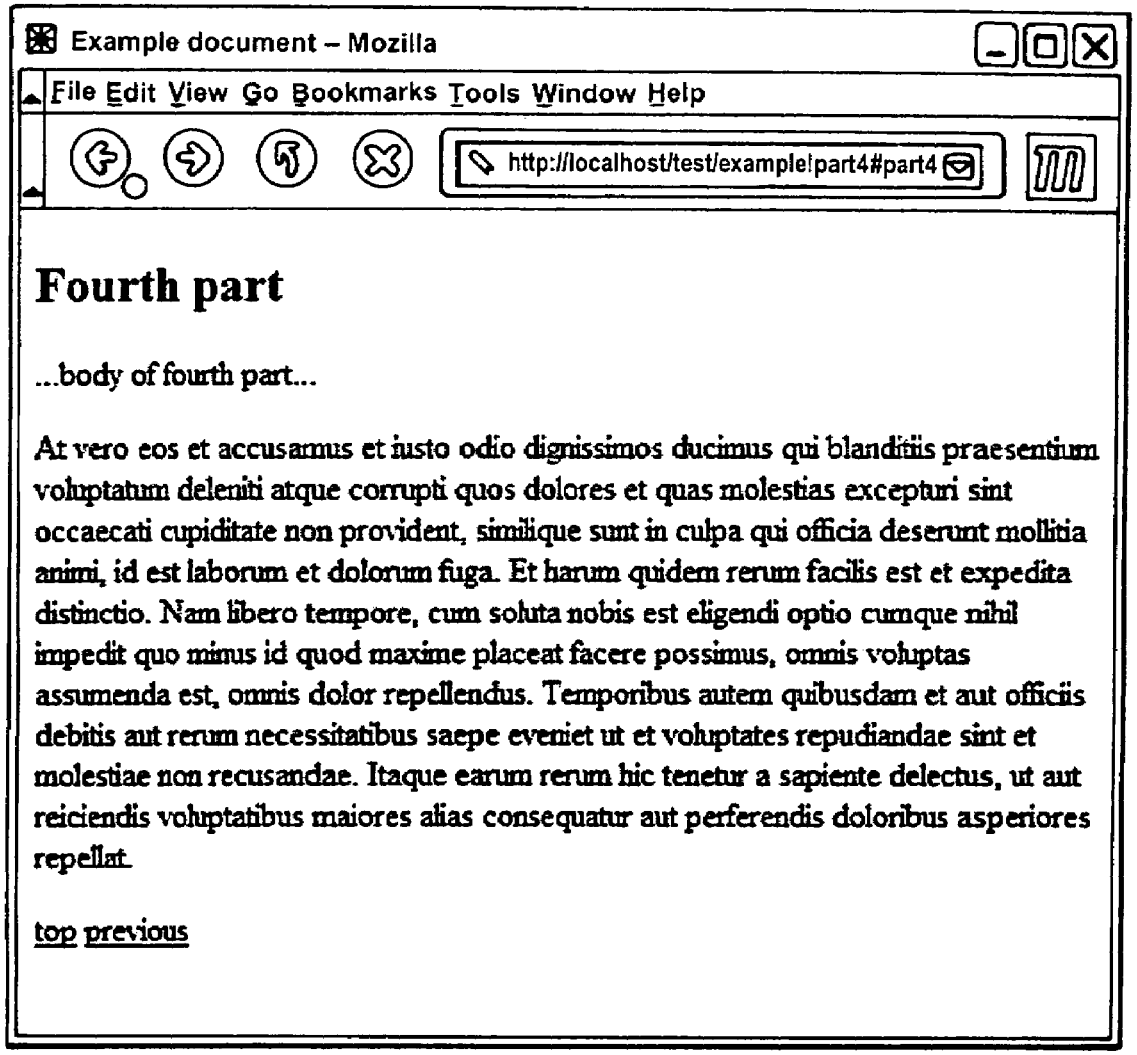

Referring to FIG. 15, if the browser on the Pocket PC 12 sends a request to the server 10 for the document 'example' using the bookmarked URL 'http://A/B/ . . . /example!part3#part3', then the server 10 again receives this request including the URL 'http://A/B/ . . . /example!part3', checks the user agent string in the request, identifies the requesting user device as a Pocket PC, and interprets the request as being for delivery of the document at 'http://A/B/ . . . /example.part3', and delivers the source for the third part of the document as shown in FIG. 9. This is then displayed on the screen 23 of the Pocket PC 12 in the form shown in FIG. 17.

If the browser on the Pocket PC 12 sends a request to the server 10 including a URL of the format 'http://A/B/ . . . /example', then the server 10 determines from the user agent string of the request that the request is from a Pocket PC. Since no part of the document is identified in the request, the server is arranged to interpret this as a request for the first part of the document, and therefore delivers the document 'example.part1' i.e. the first part of the requested document. The server rules shown in FIG. 11 do not specifically support this behaviour, but it will be appreciated that they can be modified to do so. This ensures that the whole document 'example' is not sent to the Pocket PC 12, which could overload its presentation capabilities. Since this part of the document as delivered includes links to the other parts of the document, the user can easily request other parts of the document as necessary.

In a modification to the system described above the server can be arranged to deliver the document at three or more levels of granularity. For example for a large screen PC, the server can deliver the whole document, for a PDA or similar device, the server can deliver more than one of the parts, but not the whole document, and for a mobile phone or similar device with a very small screen, the server can deliver just one part of the document. The mechanisms for achieving this would be the same as described above, but with the server arranged to provide the extra level(s) of granularity selection.

In a further modification, the server is arranged to have the document stored in only one format, either as a single file having the complete document in it, or as separate files each having a respective part of the document in it. The server can then be arranged to actively modify the stored document if required on receipt of a request, either to extract a part of the whole document for a small screen device, or to combine the parts into a single document for a large screen device.

The invention claimed is:

1. A system for storing a document, a beginning and end of a document content being defined by machine readable labels, and a beginning and end of a defined part of the document content being defined by further machine readable labels, the system being configured to:
    process a request from a client for the document, the request having a form of a URI (uniform resource identifier) which includes a first identifier signifying the document and a second identifier signifying the defined part;
    establish a set of capabilities of the client from the request;
    establish from the set of capabilities whether the second identifier is redundant; and
    dispatch a dispatched part, wherein the dispatched part is the entire document if the second identifier is redundant, and wherein the dispatched part is the defined part if the second identifier is not redundant.

2. The system according to claim 1 configured to determine the set of capabilities of the client from a header of the request.

3. The system according to claim 1 further configured to deliver, with the defined part as the dispatched part, a third identifier for a part of the document read by the client, the third identifier including a component identifying the part of the document and a fragment identifier also identifying the part of the document.

4. The system according to claim 3 which is configured to dispatch the third identifier with defined part as the dispatched part, such that the third identifier identifies the dispatched part to the client.

5. The system according to claim 4 wherein the third identifier is interpreted by the client as at least part of a URI (uniform resource identifier) of the defined part as the dispatched part.

6. The system according to claim 3 wherein the third identifier forms part of a link to a first part of the document embedded in a second part of the document.

7. The system according to claim 6 configured to deliver the first and second parts of the document together to the client as the defined and dispatched part, such that the link can be used by the client to move between the parts of the document.

8. The system according to claim 6 configured, to deliver the second part of the document as the defined and dispatched part, wherein the link can be used by the client to request delivery of the first part of the document from the server.

9. A computer-readable medium with computer code embodied therein for causing, when executed a server storing a document, a beginning and end of a document content being defined by machine readable labels, and a beginning and end of a defined part of the document content being defined by further machine readable labels, to:

process a request from a client for the document, the request having the form of a URI (uniform resource identifier) which includes a first identifier signifying the document and a second identifier signifying the defined part;

establish a set of capabilities of the client from the request;

establish from the set of capabilities whether the second identifier is redundant; and dispatch a dispatched part, wherein the dispatched part is the entire document if the second identifier is redundant, and wherein the dispatched part is the defined part if the second identifier is not redundant.

10. A method of operating a server to process a request from a client for delivery to the client of a document stored on the server, the document having a document content defined by machine readable labels, and a defined part of the document content being defined by further machine readable labels, the method comprising:

processing by computer a request from the client for the document, the request having a form of a URI (uniform resource identifier) which includes a first identifier signifying the document and a second identifier signifying the defined part;

establishing by computer a set of capabilities of the client from the request;

establishing by computer from the set of capabilities whether the second identifier is redundant; and dispatching a dispatched part, wherein the dispatched part is the entire document if the second identifier is redundant, and wherein the dispatched part is the defined part if the second identifier is not redundant.

* * * * *